(12) United States Patent  
Qiu (10) Patent No.: US 11,999,465 B2  
(45) Date of Patent: Jun. 4, 2024

(54) UNMANNED AERIAL VEHICLE (71) Applicant: AUTEL ROBOTICS CO., LTD., Guangdong (CN)

(72) Inventor: Longxue Qiu, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 127 days.

(21) Appl. No.: 17/659,683

(22) Filed: Apr. 19, 2022

(65) Prior Publication Data

US 2022/0234718 A1 Jul. 28, 2022

Related U.S. Application Data

(63) Continuation of application No. PCT/CN2020/122539, filed on Oct. 21, 2020.

(30) Foreign Application Priority Data

Oct. 21, 2019 (CN) .......................... 201911001523.7

(51) Int. Cl.  
*B64C 1/26* (2006.01)  
*B64C 39/02* (2023.01)  
*B64U 10/25* (2023.01)

(52) U.S. Cl.  
CPC .............. *B64C 1/26* (2013.01); *B64C 39/024* (2013.01); *B64U 10/25* (2023.01)

(58) Field of Classification Search  
CPC .................................. B64C 1/26; B64U 10/25  
See application file for complete search history.

(56) References Cited

U.S. PATENT DOCUMENTS 4,599,011 A * 7/1986 Tashiro ................ F16B 35/041  
  403/245  
8,128,032 B2 * 3/2012 Pajard ...................... B64C 1/26  
  244/131

(Continued)

FOREIGN PATENT DOCUMENTS

CN 201535295 U 7/2010  
CN 104343790 A 2/2015

(Continued)

OTHER PUBLICATIONS

Extended European Search Report, dated Oct. 31, 2022, EP 20878980.0.

(Continued)

*Primary Examiner* — Tye William Abell  
(74) *Attorney, Agent, or Firm* — Frank Gao, Esq.

(57) ABSTRACT

The embodiment is an unmanned aerial vehicle, including a body and wings. A first connection portion is disposed on one of the body and the wing. A second connection portion is disposed on the other of the body and the wing. The first connection portion and the second connection portion are detachably connected. The first connection portion is engaged with the second connection portion. The body and the wing are locked by rotating or sliding the second connection portion. The body can be conveniently assembled with or disassembled from the wing and the connection part meets the reliability of strength and rigidity and does not affect the flight performance.

14 Claims, 6 Drawing Sheets

(56) References Cited

U.S. PATENT DOCUMENTS

| | | | | |
|---|---|---|---|---|
| 8,939,810 B1* | 1/2015 | Suknanan | ............... | A63H 27/02 |
| | | | | 446/93 |
| 9,150,301 B2* | 10/2015 | Liu | ........................ | B64U 30/14 |
| 10,661,882 B2* | 5/2020 | Haley | ..................... | B64U 30/12 |
| 2006/0091258 A1* | 5/2006 | Chiu | ...................... | B64U 20/40 |
| | | | | 244/119 |

FOREIGN PATENT DOCUMENTS

| | | | |
|---|---|---|---|
| CN | 207157486 U | 3/2018 |
| CN | 109911174 A | 6/2019 |
| CN | 110615097 A | 12/2019 |
| CN | 110775248 A | 2/2020 |
| CN | 211592904 U | 9/2020 |
| CN | 211731806 U | 10/2020 |

OTHER PUBLICATIONS

PCT International Search Report dated Jan. 20, 2021; PCT/CN2020/122539.

* cited by examiner

UNMANNED AERIAL VEHICLE

CROSS-REFERENCE TO RELATED APPLICATIONS

The present application is a continuation of International Application No. PCT/CN2020/122539, filed on Oct. 21, 2020, which claims priority to Chinese patent application No. 201911001523.7, filed on Oct. 21, 2019, which is incorporated herein by reference in its entirety.

TECHNICAL FIELD

The present invention relates to the field of aircrafts and in particular, to an unmanned aerial vehicle.

BACKGROUND

At present, the rapid integration and separation of wings and a body of an unmanned aerial vehicle can facilitate the packaging and transportation of the unmanned aerial vehicle, which requires the connection between the body and the wings to meet the reliability of strength and rigidity without affecting the flight performance and requires easy and fast disassembly and assembly.

SUMMARY

To realize that connection between a body and wings of an unmanned aerial vehicle meets the reliability of strength and rigidity, does not affect the flight performance and facilitates disassembly and assembly, an objective of the present invention is to provide an unmanned aerial vehicle.

To achieve the foregoing objective, the present invention adopts the following technical solutions:

An unmanned aerial vehicle is provided, including a body and wings, where a first connection portion is disposed on one of the body and the wing and a second connection portion is disposed on the other of the body and the wing, the first connection portion and the second connection portion being detachably connected; and the first connection portion is engaged with the second connection portion and the body and the wing are locked by rotating or sliding the second connection portion.

Further, the first connection portion includes a latch member and a protrusion disposed on the latch member, a cross-sectional width of the protrusion being greater than a cross-sectional width of the latch member; and the second connection portion includes a locking member, where a guide groove for sliding of the latch member and a mounting groove for clamp fit with the protrusion are provided on the locking member, the guide groove being in communication with the mounting groove and a width of the guide groove being less than the cross-sectional width of the latch member.

Further, the first connection portion is disposed on the body and the second connection portion is disposed on the wing.

Further, a through hole is provided on the wing, the locking member is rotatably mounted in the through hole and a mounting hole adapted to the mounting groove is provided on a side wall of the through hole.

Further, the locking member is cylindrical.

Further, the second connection portion further includes a first limiting member disposed on the locking member and a second limiting member that matches the first limiting member to limit a rotation range of the locking member is disposed in the through hole.

Further, the second connection portion further includes a pressing block disposed at an end of the through hole to prevent the locking member from moving out of the through hole.

Further, the wing includes a wing body and a connecting bracket mounted on the wing body, the through hole being disposed on the connecting bracket.

Further, a sliding groove is provided on the wing and the locking member is a sliding block slidably mounted in the sliding groove.

Further, the second connection portion further includes an elastic member disposed in the sliding groove, one end of the elastic member abutting against an inner side of the sliding groove and the other end of the elastic member abutting against the locking member.

Further, the protrusion is spherical.

Further, a first electrical connector is disposed on the body and a second electrical connector in pluggable fit with the first electrical connector is disposed on the wing.

Further, a support member is disposed on one of the body and the wing and a clamping groove in clamp fit with the support member is disposed on the other of the body and the wing.

Further, the support member is tubular and a cross section of the support member is rectangular.

Further, there are two first connection portions and two second connection portions, where the two first connection portions are respectively disposed on two sides of the support member and the two second connection portions are respectively disposed on two sides of the support member.

Compared with the prior art, the present invention has the following beneficial effects: The first connection portion is disposed on one of the body and the wing and the second connection portion is disposed on the other of the body and the wing. The first connection portion is engaged with the second connection portion and the body and the wing are locked by rotating or sliding the second connection portion. In this way, the body can be conveniently assembled with or disassembled from the wing and the connection part meets the reliability of strength and rigidity and does not affect the flight performance.

1: Body; 10: First connection portion; 11: Latch member; 12: Protrusion; 2: Wing; 20: Second connection portion; 21: Locking member; 211: Guide groove; 212: Mounting groove; 22: Through hole; 221: Mounting hole; 222: Second limiting member; 23: First limiting member; 24: Pressing block; 25: Wing body; 26: Connecting bracket; 27: Sliding groove; 28: Push button; 29: Elastic member; 3: Support member; 4: Clamping groove; 5: First electrical connector; and 6: second electrical connector.

DETAILED DESCRIPTION

For ease of understanding the present invention, the present invention is described in more detail below with reference to the accompanying drawings and specific embodiments. It should be noted that, when a component is expressed as "being fixed to" another component, the component may be directly on the another component, or one or more intermediate components may exist between the component and the another component. When one component is expressed as "being connected to" another component, the component may be directly connected to the another component, or one or more intermediate components may exist between the component and the another component. The terms "vertical", "horizontal", "left", "right" and similar expressions in this specification are merely used for an illustrative purpose.

Unless otherwise defined, meanings of all technical and scientific terms used in this specification are the same as those usually understood by a person skilled in art of the present invention. Terms used in the specification of the present invention are merely intended to describe objectives of the specific embodiments and are not intended to limit the present invention. A term "and/or" used in this specification includes any or all combinations of one or more related listed items.

The present invention is further described below with reference to the accompanying drawings and specific embodiments. It should be noted that, the following embodiments or technical features may be arbitrarily combined into new embodiments in case of no conflicts.

Figure 1:
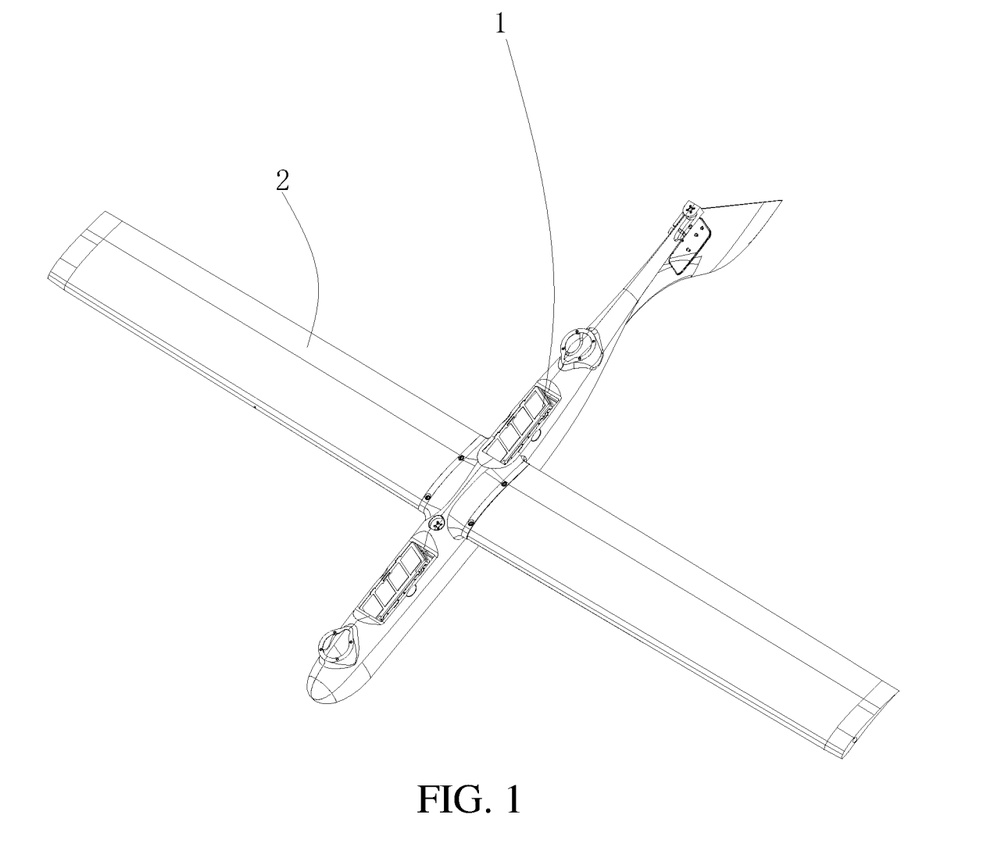
FIG. 1 is a schematic diagram of an unmanned aerial vehicle according to an embodiment of the present invention.
Figure 2:
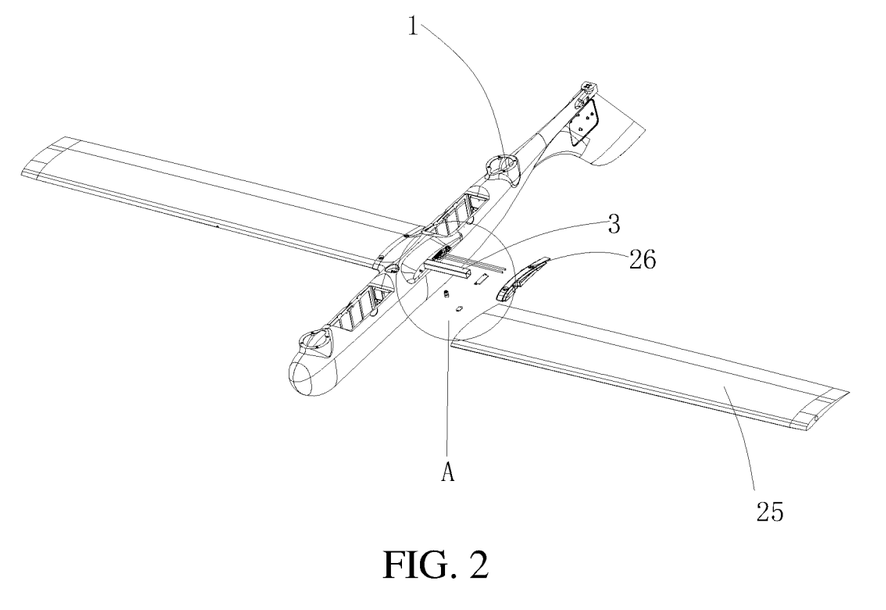
FIG. 2 is an exploded view of an unmanned aerial vehicle according to an embodiment of the present invention.
Figure 3:
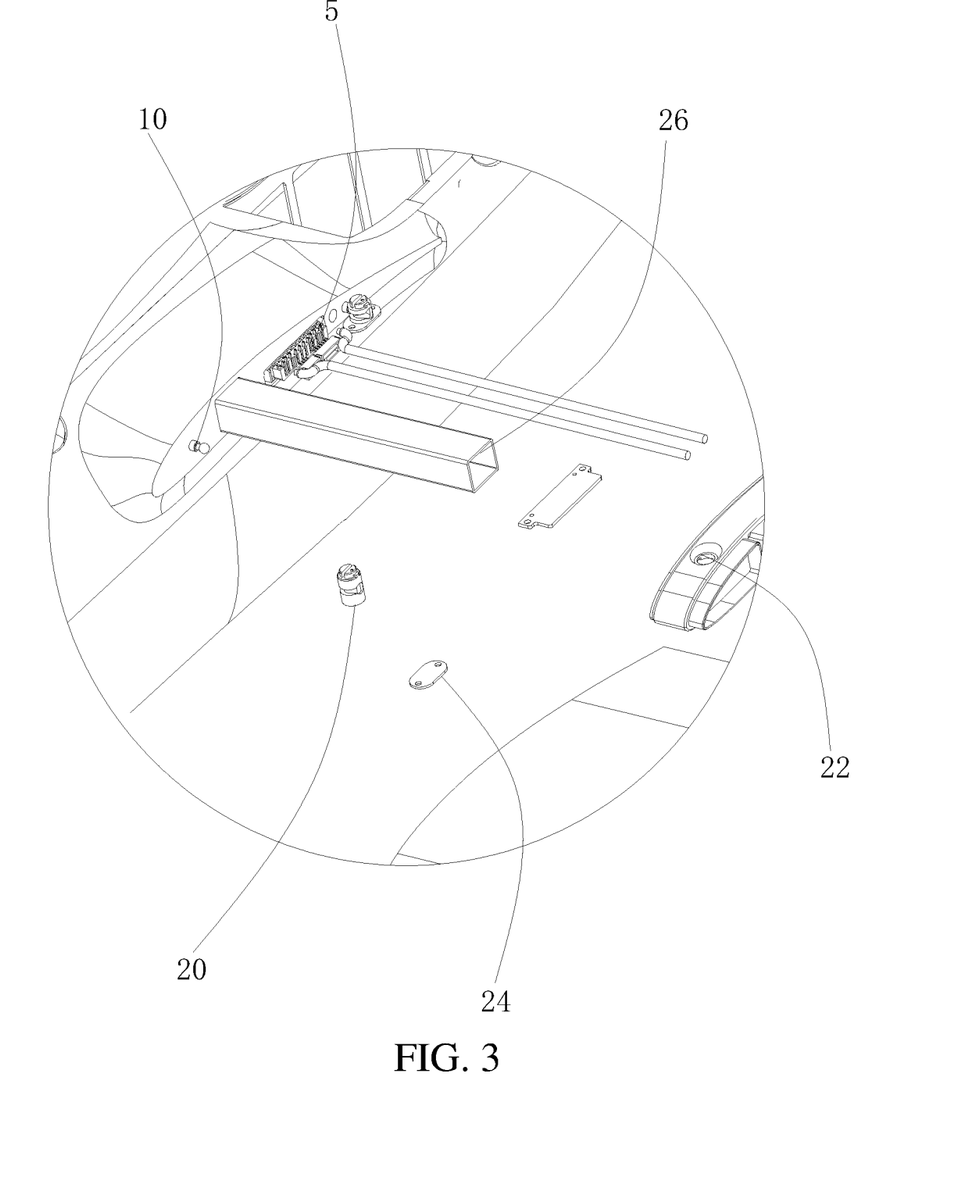
FIG. 3 is an enlarged view of A in FIG. 2.

As shown in FIG. 1 to FIG. 3, an unmanned aerial vehicle provided in an embodiment of the present invention includes a body 1 and wings 2. A first connection portion 10 is disposed on one of the body 1 and the wing 2. A second connection portion 20 is disposed on the other of the body and the wing. The first connection portion 10 and the second connection portion 20 are detachably connected. The first connection portion 10 is engaged with the second connection portion 20. The body 1 and the wing 2 are locked by rotating or sliding the second connection portion 20. The second connection portion 20 is rotated or slid and the first connection portion 10 and the second connection portion 20 are separated to implement unlocking of the body 1 from the wing 2, which facilitates the disassembly and assembly, meets the reliability of strength and rigidity and does not affect the flight performance.

Figure 4:
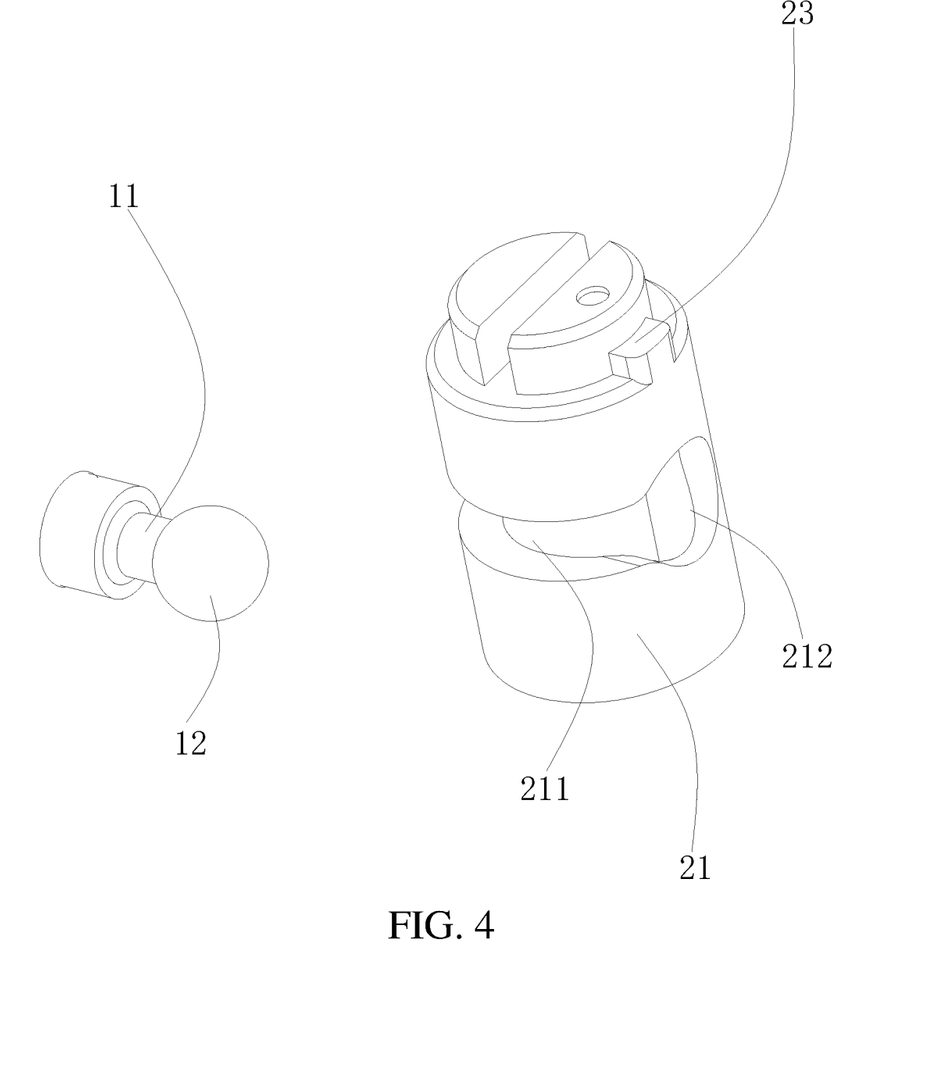
FIG. 4 is a schematic diagram of a first connection portion and a second connection portion according to an embodiment of the present invention.

As shown in FIG. 2 to FIG. 4, the first connection portion 10 includes a latch member 11 and a protrusion 12 disposed on the latch member 11, a cross-sectional width of the protrusion 12 being greater than a cross-sectional width of the latch member 11. The second connection portion 20 includes a locking member 21. A guide groove 211 for sliding of the latch member 11 and a mounting groove 212 for clamp fit with the protrusion 12 are provided on the locking member 21. The guide groove 211 is in communication with the mounting groove 212. A width of the guide groove 211 is less than the cross-sectional width of the latch member 11. When the locking member is moved until the mounting groove 212 is aligned with the protrusion 12, the protrusion 12 extends into the locking member 21 through the mounting groove 212. The locking member 21 is moved to cause the latch member 11 to slide into the guide groove 211. In this way, the latch member 11 is locked with the locking member 21, thereby locking the first connection portion 10 and the second connection portion 20. When the locking member 21 is moved, to cause the latch member 11 to slide in the guide groove 211 to align the protrusion 12 with the mounting groove 212, the latch member 11 is pulled out, thereby unlocking the first connection portion 10 from the second connection portion 20.

As shown in FIG. 3, in an embodiment, the first connection portion 10 is disposed on the body 1 and the second connection portion 20 is disposed on the wing 2. That is, the latch member 11 is protruded on the body 1 and the locking member 21 is movably mounted on the wing 2.

Figure 5:
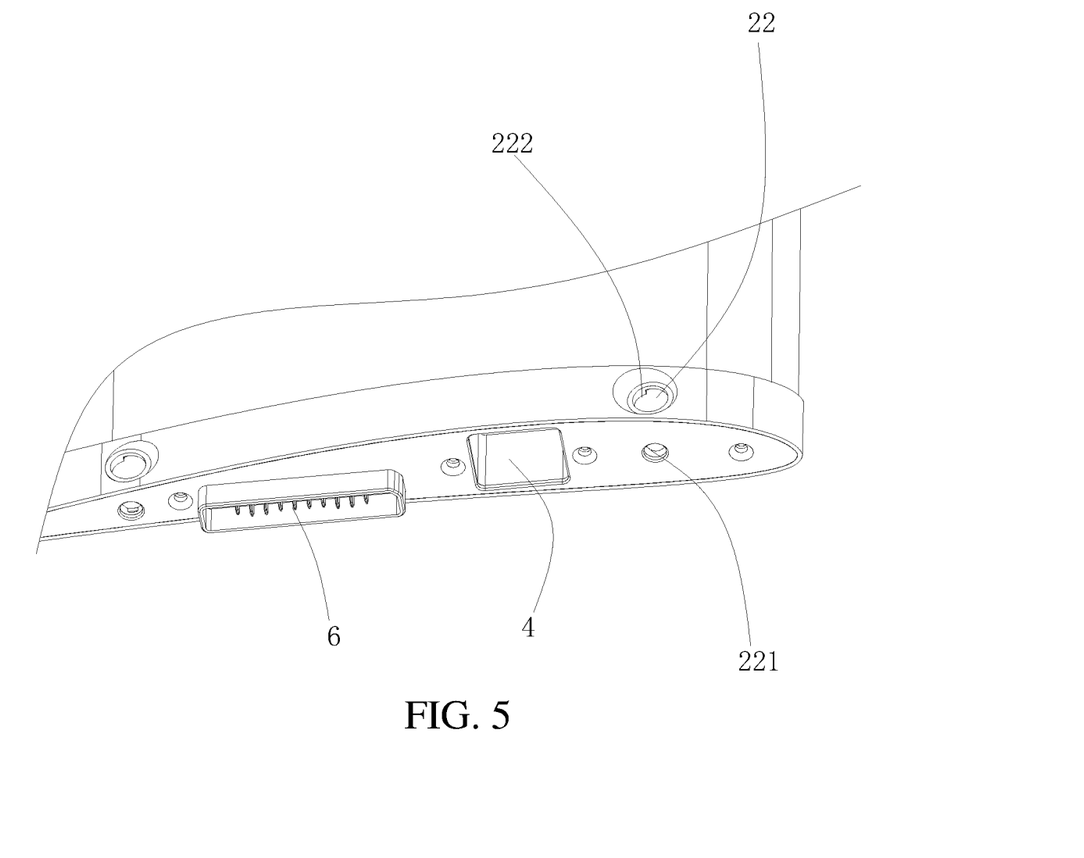
FIG. 5 is a schematic diagram of a wing according to an implementation of the present invention.

As shown in FIG. 3 to FIG. 5, in an implementation, a through hole 22 is provided on the wing 2. The locking member 21 is cylindrical. The locking member 21 is rotatably mounted in the through hole 22. A mounting hole 221 adapted to the mounting groove 212 is provided on a side wall of the through hole 22. The protrusion 12 is spherical, which reduces friction on the second connection portion 20 during mounting and removal. When the locking member 21 is rotated to align the mounting groove 212 with the mounting hole 221, the protrusion 12 extends into the mounting groove 212. The locking member 21 is rotated to cause the latch member 11 to slide into the guide groove 211 to implement locking.

Further, the second connection portion 20 further includes a first limiting member 23 disposed on the locking member 21. A second limiting member 222 that matches the first limiting member 23 to limit a rotation range of the locking member 21 is disposed in the through hole 22, so that the first connection portion 10 and the second connection portion 20 are fixed more firmly.

Further, the second connection portion 20 further includes a pressing block 24 disposed at an end of the through hole 22 to prevent the locking member 21 from moving out of the through hole 22. The pressing block 24 is fixed on the wing 2 by bolts.

Further, the wing 2 includes a wing body 25 and a connecting bracket 26 mounted on the wing body 25. The through hole 22 is provided on the connecting bracket 26. The connecting bracket 26 may be inserted into the wing body 25, may be glued into the wing body 25, or may be fixed on the wing body 25 by bolts.

Figure 6:
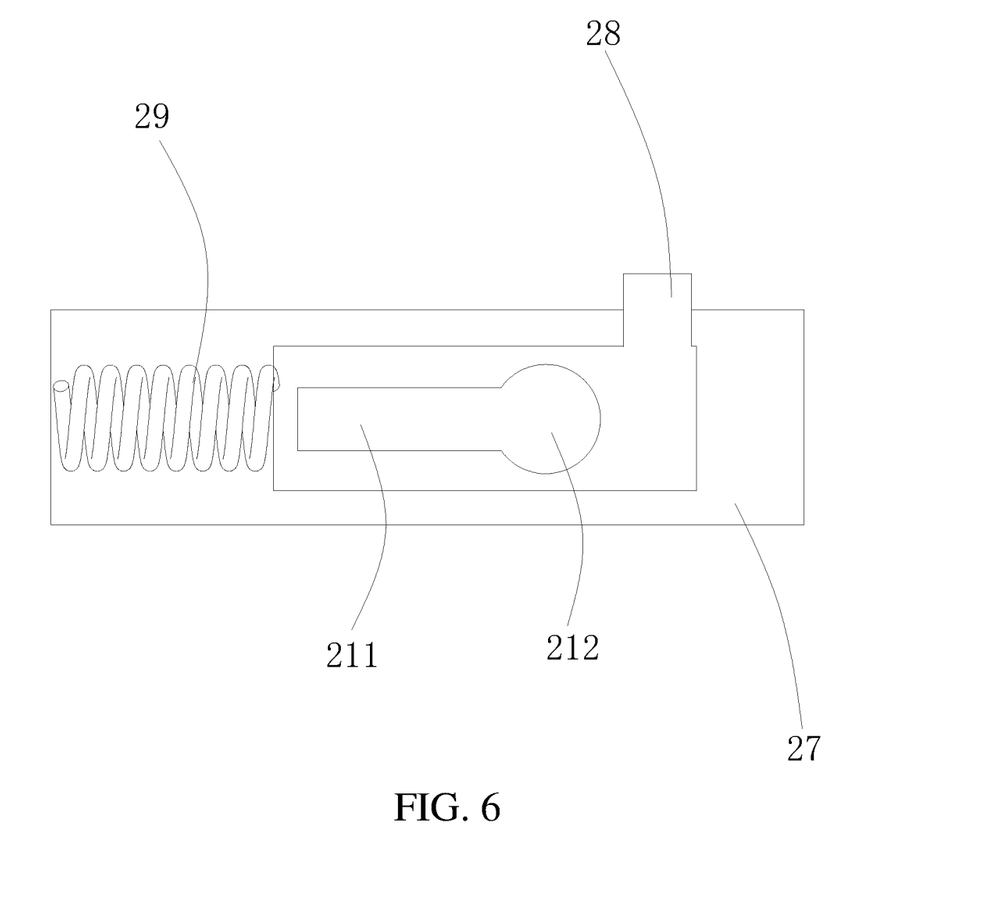
FIG. 6 is a schematic diagram of matching between a wing and a locking member according to another implementation of the present invention.

As shown in FIG. 6, in another implementation, a sliding groove 27 is provided on the wing 2 and the locking member 21 is a sliding block slidably mounted in the sliding groove 27. A push button 28 for pushing the locking member 21 is disposed on the locking member 21. When the push button 28 is pushed to cause the locking member 21 to slide until the mounting groove 212 is aligned with the protrusion 12, the protrusion 12 extends into the locking member 21 through the mounting groove 212. The locking member 21 is slid to cause the latch member 11 to slide into the guide groove 211 to implement locking. The locking member 21 is slid to align the mounting groove 212 with the protrusion 12 and the latch member 11 is pulled out to implement unlocking.

Further, the second connection portion 20 further includes an elastic member 29 disposed in the sliding groove 27. One end of the elastic member 29 abuts against an inner side of the sliding groove 27. The other end of the elastic member 29 abuts against the locking member 21. The elastic member 29 is configured to provide a restoring force for the locking member 21 to ensure the reliability of the connection between the first connection portion 10 and the second connection portion 20.

As shown in FIG. 2 to FIG. 5, in an embodiment, a support member 3 is disposed on one of the body 1 and the wing 2 and a clamping groove 4 in clamp fit with the support member 3 is provided on the other of the body and the wing. As shown in FIG. 3, an end of the support member 3 is fixed on the body 1. The clamping groove 4 is provided on the wing 2. When the wing 2 is mounted, the wing 2 is first mounted on the support member 3 through the clamping groove 4, to implement rough positioning and make the mounting faster. In addition, the support member 3 plays a role in supporting the wing 2, making the connection part firmer. The support member 3 is tubular and a cross section of the support member 3 is rectangular, to reduce the weight of the unmanned aerial vehicle.

As shown in FIG. 3, there are two first connection portions 10 and two second connection portions 20 connecting each wing 2 to the body 1. The two first connection portions 10 are respectively disposed on two sides of the support member 3. The two second connection portions 20 are respectively disposed on two sides of the support member 3.

It may be understood that in another embodiment, the first connection portion 10 is disposed on the wing 2 and the second connection portion 20 is disposed on the body 1. That is, the latch member 11 is protruded on the wing 2 and the locking member 21 is movably mounted on the body 1.

As shown in FIG. 3 and FIG. 5, a first electrical connector 5 is disposed on the body 1 and a second electrical connector 6 in pluggable fit with the first electrical connector 5 is disposed on the wing 2. The wing 2 is electrically connected to the first electrical connector 5 through the second electrical connector 6 to obtain a control instruction.

The foregoing embodiments are merely exemplary implementations of the present invention and cannot be used to limit the protection scope of the present invention. Any insubstantial change and substitution made by those skilled in the art based on the present invention belongs to the protection scope required by the present invention.

What is claimed is:

1. An unmanned aerial vehicle, comprising a body and wings, a first connection portion is disposed on one of the body and the wing and a second connection portion is disposed on the other of the body and the wing, the first connection portion and the second connection portion being detachably connected; and the first connection portion is engaged with the second connection portion and the body and the wing are locked by rotating or sliding the second connect portion, wherein the first connection portion comprises a latch member and a protrusion disposed on the latch member, a cross-sectional width of the protrusion being greater than a cross-sectional width of the latch member; and the second connection portion comprises a locking member, wherein a guide groove for sliding of the latch member and a mounting groove for clamp fit with the protrusion are provided on the locking member, the guide groove being in communication with the mounting groove and a width of the guide groove being less than the cross-sectional width of the latch member.

2. The unmanned aerial vehicle according to claim 1, wherein the protrusion is spherical.

3. The unmanned aerial vehicle according to claim 1, wherein a first electrical connector is disposed on the body and a second electrical connector in pluggable fit with the first electrical connector is disposed on the wing.

4. The unmanned aerial vehicle according to claim 1, wherein a support member is disposed on one of the body and the wing and a clamping groove in clamp fit with the support member is disposed on the other of the body and the wing.

5. The unmanned aerial vehicle according to claim 4, wherein the support member is tubular and a cross section of the support member is rectangular.

6. The unmanned aerial vehicle according to claim 4, wherein there are two first connection portions and two second connection portions, wherein the two first connection portions are respectively disposed on two sides of the support member and the two second connection portions are respectively disposed on two sides of the support member.

7. The unmanned aerial vehicle according to claim 1, wherein the first connection portion is disposed on the body and the second connection portion is disposed on the wing.

8. The unmanned aerial vehicle according to claim 7, wherein a sliding groove is provided on the wing and the locking member is a sliding block slidably mounted in the sliding groove.

9. The unmanned aerial vehicle according to claim 8, wherein the second connection portion further comprises an elastic member disposed in the sliding groove, one end of the elastic member abutting against an inner side of the sliding groove and the other end of the elastic member abutting against the locking member.

10. The unmanned aerial vehicle according to claim 7, wherein a through hole is provided on the wing, the locking member is rotatably mounted in the through hole and a mounting hole adapted to the mounting groove is provided on a side wall of the through hole.

11. The unmanned aerial vehicle according to claim 10, wherein the locking member is cylindrical.

12. The unmanned aerial vehicle according to claim 10, wherein the second connection portion further comprises a first limiting member disposed on the locking member and a second limiting member that matches the first limiting member to limit a rotation range of the locking member is disposed in the through hole.

13. The unmanned aerial vehicle according to claim 10, wherein the second connection portion further comprises a pressing block disposed at an end of the through hole to prevent the locking member from moving out of the through hole.

14. The unmanned aerial vehicle according to claim 10, wherein the wing comprises a wing body and a connecting bracket mounted on the wing body, the through hole being disposed on the connecting bracket.

* * * * *